US009123971B2

(12) United States Patent
Shimura et al.

(10) Patent No.: US 9,123,971 B2
(45) Date of Patent: Sep. 1, 2015

(54) SECONDARY BATTERY

(75) Inventors: Midori Shimura, Tokyo (JP); Daisuke Kawasaki, Tokyo (JP); Masahiro Suguro, Tokyo (JP); Yoko Hashizume, Tokyo (JP); Kazuaki Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/820,356

(22) PCT Filed: Jun. 23, 2011

(86) PCT No.: PCT/JP2011/064407
§ 371 (c)(1),
(2), (4) Date: Mar. 1, 2013

(87) PCT Pub. No.: WO2012/029387
PCT Pub. Date: Mar. 8, 2012

(65) Prior Publication Data
US 2013/0157120 A1 Jun. 20, 2013

(30) Foreign Application Priority Data
Sep. 2, 2010 (JP) .................................. 2010-196621

(51) Int. Cl.
H01M 10/0567 (2010.01)
H01M 10/0566 (2010.01)
(Continued)

(52) U.S. Cl.
CPC .......... *H01M 10/0566* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS 6,641,957 B1    11/2003  Kawaguchi et al.
2002/0094479 A1*  7/2002  Gan et al. ...................... 429/212
(Continued)

FOREIGN PATENT DOCUMENTS

JP    6-325765 A    11/1994
JP    11-219723 A    8/1999
(Continued)

OTHER PUBLICATIONS machine translation of JP 11-219723, retrieved from <http://www19.ipdl.inpit.go.jp/PA1/cgi-bin/PA1DETAIL> on Apr. 2, 2014.*
(Continued)

*Primary Examiner* — Cynthia K Walls
(74) *Attorney, Agent, or Firm* — Sughrue Mion, PLLC

(57) ABSTRACT

The object of an exemplary embodiment of the invention is to provide a secondary battery with a high performance in which the generation of the swelling can be suppressed and in which the cycle property is excellent. An exemplary embodiment of the invention is a secondary battery, comprising an electrode assembly in which a positive electrode and a negative electrode are oppositely disposed, an electrolyte liquid, and a package which encloses the electrode assembly and the electrolyte liquid inside; wherein the negative electrode is formed by binding a negative electrode active substance, which comprises metal (a) that can be alloyed with lithium, metal oxide (b) that can absorb and desorb lithium ion, and carbon material (c) that can absorb and desorb lithium ion, to a negative electrode collector with at least one selected from polyimides and a polyamide-imides; and wherein the electrolyte liquid comprises a compound represented by any one of predetermined formulae.

11 Claims, 1 Drawing Sheet

(51) Int. Cl.
  *H01M 10/0564* (2010.01)
  *H01M 10/052* (2010.01)
  *H01M 10/05* (2010.01)
  *H01M 4/131* (2010.01)
  *H01M 4/133* (2010.01)
  *H01M 4/134* (2010.01)
  *H01M 4/36* (2006.01)
  *H01M 4/62* (2006.01)
  *H01M 10/0585* (2010.01)
  *H01M 10/0525* (2010.01)
  *H01M 4/38* (2006.01)
  *H01M 4/587* (2010.01)
  *H01M 10/0569* (2010.01)

(52) U.S. Cl.
  CPC ............. *H01M 4/134* (2013.01); *H01M 4/364* (2013.01); *H01M 4/386* (2013.01); *H01M 4/587* (2013.01); *H01M 4/622* (2013.01); *H01M 10/052* (2013.01); *H01M 10/0525* (2013.01); *H01M 10/0567* (2013.01); *H01M 10/0569* (2013.01); *H01M 10/0585* (2013.01); *H01M 2300/0025* (2013.01); *Y02E 60/122* (2013.01); *Y02T 10/7011* (2013.01)

(56) References Cited

U.S. PATENT DOCUMENTS

2003/0049527 A1* 3/2003 Yageta et al. ............... 429/179
2003/0165733 A1 9/2003 Takehara et al.
2003/0215711 A1* 11/2003 Aramata et al. ............ 429/218.1
2006/0222959 A1 10/2006 Koshiba et al.

FOREIGN PATENT DOCUMENTS

| | | | |
|---|---|---|---|
| JP | 2002-270181 A | | 9/2002 |
| JP | 2003-86247 A | | 3/2003 |
| JP | 2003-92137 A | | 3/2003 |
| JP | 2003-123740 A | | 4/2003 |
| JP | 2004-47404 A | | 2/2004 |
| JP | 2004-253296 A | | 9/2004 |
| JP | 2005-19969 A | | 1/2005 |
| JP | 2005-183051 A | | 7/2005 |
| JP | 2005-183264 A | | 7/2005 |
| JP | 2005-216676 A | | 8/2005 |
| JP | 2006-024407 | * | 1/2006 ............ H01M 10/40 |
| JP | 2006-24407 A | | 1/2006 |
| JP | 2006-59797 A | | 3/2006 |
| JP | 2006-173096 A | | 6/2006 |
| JP | 2008-153117 A | | 7/2008 |
| JP | 2008-166271 A | | 7/2008 |
| WO | 01/41247 A1 | | 6/2001 |

OTHER PUBLICATIONS machine translation of JP 2006-024407, retrieved from <http://www19.ipdl.inpit.go.jp/PA1/cgi-bin/PA1DETAIL> on Nov. 26, 2014.*

International Search Report for PCT/JP2011/064407 dated Oct. 4, 2011.

* cited by examiner

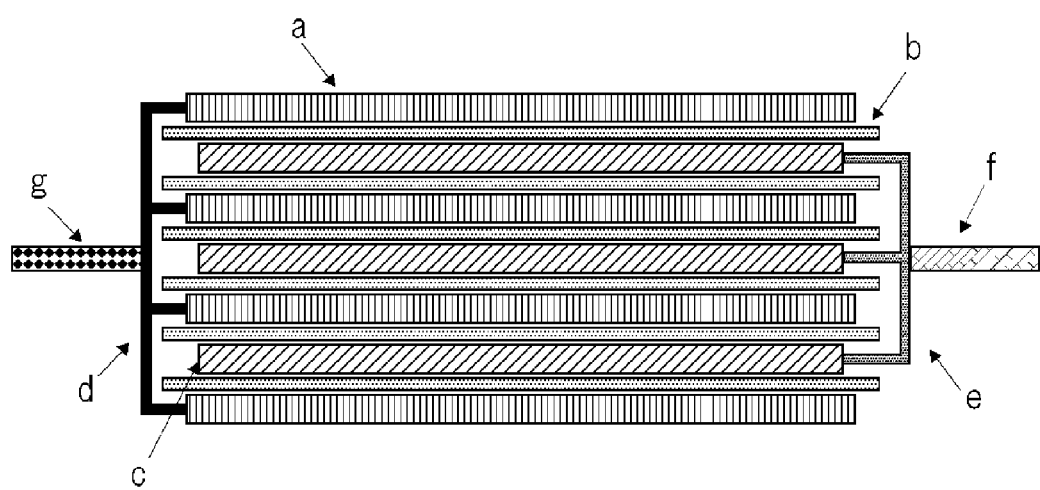

SECONDARY BATTERY

CROSS REFERENCE TO RELATED APPLICATIONS

This application is a National Stage of International Application No. PCT/JP2011/064407 filed Jun. 23, 2011, claiming priority based on Japanese Patent Application No. 2010-196621 filed Sep. 2, 2010, the contents of all of which are incorporated herein by reference in their entirety.

TECHNICAL FIELD

An exemplary embodiment of the invention relates to a secondary battery, and particularly to a lithium ion secondary battery.

BACKGROUND ART

With the rapidly expansion of the market for laptop computers, mobile phones, electric vehicles, and the like, a secondary battery having a high energy density is required. Examples of a method for obtaining a secondary battery having a high energy density include a method in which a negative electrode material having a large capacity is used, and a method in which an electrolyte liquid having excellent stability is used.

Patent document 1 discloses using a silicon oxide or a silicate as a negative electrode active substance of a secondary battery. Patent document 2 discloses a negative electrode for a secondary battery which has an active substance layer containing a carbon material particle that can absorb and desorb lithium ion, a metal particle that can be alloyed with lithium, and an oxide particle that can absorb and desorb lithium ion. Patent document 3 discloses a negative electrode material for a secondary battery which is formed by coating the surface of a particle, which has a structure in which a silicon fine crystal is dispersed in a silicon compound, with carbon.

Patent document 4 discloses using a negative electrode that can absorb and desorb lithium and using a nitrile compound having a carbon-carbon unsaturated bond in an electrolyte liquid.

Patent document 5 discloses using an electrolyte liquid which contains a nitrile compound having a specified structure.

Patent document 6 discloses using an electrode active substance which contains a phthalimide compound.

Patent document 7 discloses using an electrolyte liquid which contains a phthalic imide derivative.

Patent document 8 discloses using an electrolyte liquid which contains a compound consisting of benzimidazolone or benzoyleneurea, or a derivative thereof.

Patent document 9 discloses using an electrolyte liquid which contains pthalazone or a derivative thereof.

Patent document 10 discloses using an electrolyte liquid which contains a compound represented by a predetermined formula.

Patent document 11 discloses using an electrolyte liquid which contains a polymer particle having a carbodiimide unit and having an average particle diameter of 10 μm or less as an additive for a battery.

Patent document 12 discloses using an electrolyte liquid which contains a polymer of an uretonimine compound represented by a predetermined formula.

CITATION LIST

Patent Document

Patent document 1: JP 6-325765 A
Patent document 2: JP 2003-123740 A
Patent document 3: JP 2004-47404 A
Patent document 4: JP 2003-86247 A
Patent document 5: JP 2008-166271 A
Patent document 6: JP 2002-270181 A
Patent document 7: WO 2001/041247
Patent document 8: JP 2006-24407 A
Patent document 9: JP 2006-173096 A
Patent document 10: JP 2006-059797 A
Patent document 11: JP 2005-216676 A
Patent document 12: JP 2005-19969 A

SUMMARY OF THE INVENTION

Problem to be Solved by the Invention

However, when the charging and discharging are carried out at 45° C. or higher in the case where the silicon oxide disclosed in Patent document 1 is used as a negative electrode active substance, there has been a problem that a capacity deterioration associated with the charge/discharge cycle may become significantly large.

The negative electrode for a secondary battery disclosed in Patent document 2 has an effect in which the volume change of the negative electrode as a whole is relaxed due to the different charge/discharge electric potentials of three kinds of components when lithium is absorbed and desorbed. However, in Patent document 2, there have been some points which are not sufficiently studied, regarding a relationship among three kinds of components in a state of coexistence, and regarding a binder, an electrolyte liquid, a conformation of an electrode assembly, and a package which are indispensable for a formation of a lithium ion secondary battery.

The negative electrode material for a secondary battery disclosed in Patent document 3 also has an effect in which the volume change of the negative electrode as a whole is relaxed. However, in Patent document 3, there have been some points which are not sufficiently studied, regarding a binder, an electrolyte liquid, a conformation of an electrode assembly, and a package which are indispensable for a formation of a lithium ion secondary battery.

In Patent documents 4 and 5, there have been some points which are not sufficiently studied, regarding a negative electrode active substance, a conformation of an electrode assembly, and a package which are indispensable for a formation of a lithium ion secondary battery.

In Patent documents 6 to 12, there have been some points which are not sufficiently studied, regarding a negative electrode active substance, a negative electrode binder, a conformation of an electrode assembly, and a package which are indispensable for a formation of a lithium ion secondary battery.

Also, conventionally in a secondary battery, there has been a problem of swelling due to generation of gas or the like. The swelling is generated by decomposition of an electrolyte liquid or the like or by the like, but the generation of the swelling results in a volume change of the battery and a deformation of the electrode assembly.

Thus, the object of an exemplary embodiment of the invention is to provide a secondary battery with a high performance in which the generation of the swelling can be suppressed and in which the cycle property is excellent.

Means of Solving the Problem

An exemplary embodiment of the invention is a secondary battery, comprising an electrode assembly in which a positive electrode and a negative electrode are oppositely disposed, an electrolyte liquid, and a package which encloses the electrode assembly and the electrolyte liquid inside;

wherein the negative electrode is formed by binding a negative electrode active substance, which comprises metal (a) that can be alloyed with lithium, metal oxide (b) that can absorb and desorb lithium ion, and carbon material (c) that can absorb and desorb lithium ion, to a negative electrode collector with at least one selected from polyimides and a polyamide-imides; and wherein the electrolyte liquid comprises a compound represented by any one of following formulae (1) to (9).

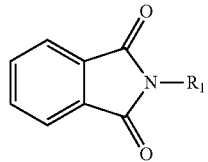
(1)

($R_1$ represents hydrogen atom, an alkyl group, an aryl group, an amino group, hydroxy group or a halogen atom.)

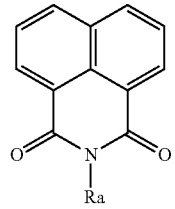
(2)

(Ra represents hydrogen atom, an alkyl group, an aryl group, an amino group, hydroxy group or a halogen atom.)

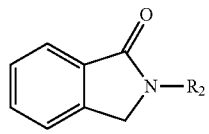
(3)

($R_2$ represents hydrogen atom, an alkyl group, an aryl group, an amino group, hydroxy group or a halogen atom.)

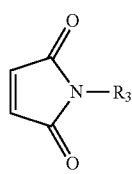
(4)

($R_3$ represents hydrogen atom, an alkyl group, an aryl group, an amino group, hydroxy group or a halogen atom.)

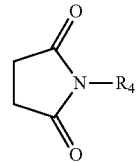
(5)

($R_4$ represents hydrogen atom, an alkyl group, an aryl group, an amino group, hydroxy group or a halogen atom.)

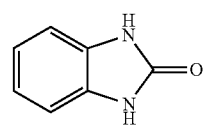
(6)

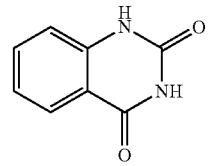
(7)

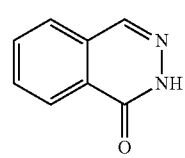
(8)

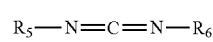
(9)

($R_5$ and $R_6$ each independently represent hydrogen atom, an alkyl group, an aryl group, an amino group, hydroxy group or a halogen atom.)

Effect of the Invention

By using an electrolyte liquid according to an exemplary embodiment of the invention, a secondary battery with a high performance, in which the generation of the swelling can be suppressed and in which the cycle property is excellent, can be provided.

BRIEF DESCRIPTION OF DRAWINGS

FIG. 1 is a schematic cross-sectional view showing a conformation of an electrode assembly in a stacked laminate type secondary battery.

MODE FOR CARRYING OUT THE INVENTION

As follows, an exemplary embodiment of the invention is explained in detail.

In a secondary battery according to an exemplary embodiment of the invention, an electrode assembly in which a positive electrode and a negative electrode are oppositely disposed and an electrolyte liquid are enclosed inside a package. As for the shape of the secondary battery, cylindrical type, flattened spiral square type, stacked square type, coin type, flattened spiral laminate type, and stacked laminate type can be used, but stacked laminate type is preferable. As follows, a stacked laminate type secondary battery is explained.

FIG. 1 is a schematic cross-sectional view showing a conformation of an electrode assembly in a stacked laminate type secondary battery. The electrode assembly has a stacked conformation in which a planer cathode and a planer anode are oppositely disposed, and the electrode assembly shown in FIG. 1 is formed by alternately stacking plural cathodes c and plural anodes a with separator b placed therebetween. Cathode collector e in each cathode c is electrically connected by being welded to one another at the end part thereof which is not covered with a positive electrode active substance, and further cathode terminal f is welded to the welded part. Anode collector d in each anode a is electrically connected by being welded to one another at the end part thereof which is not covered with a negative electrode active substance, and further anode terminal g is welded to the welded part.

There is an advantage in the electrode assembly having such a planar stacking conformation that it is hardly affected by volume change of the electrode that is associated with charging and discharging, in comparison with an electrode assembly having a spiral conformation because there is no part having a small R (an area near the spiral center of the spiral conformation). That is, it is useful as an electrode assembly in which an active substance which easily generates volume change is used.

[1] Negative Electrode

A negative electrode is formed by binding a negative electrode active substance on a negative electrode collector with a negative electrode binder.

A negative electrode active substance in the exemplary embodiment of the invention contains metal (a) that can be alloyed with lithium, metal oxide (b) that can absorb and desorb lithium ion, and carbon material (c) that can absorb and desorb lithium ion.

As metal (a), Al, Si, Pb, Sn, In, Bi, Ag, Ba, Ca, Hg, Pd, Pt, Te, Zn, La or an alloy of two or more kinds of the elements can be used. In particular, it is preferable to contain silicon (Si) as metal (a).

As metal oxide (b), silicon oxide, aluminum oxide, tin oxide, indium oxide, zinc oxide, lithium oxide or a complex thereof can be used. In particular, it is preferable to contain silicon oxide as metal oxide (b). This is because silicon oxide is relatively stable and is hard to cause a reaction with another chemical compound. Also, one element or two or more elements selected from among nitrogen, boron and sulfur can be added as metal oxide (b), for example, in the amount of 0.1 to 5 mass %. By this, the electroconductivity of metal oxide (b) can be improved.

As carbon material (c), graphite, amorphous carbon, diamond-like carbon, carbon nanotube or a complex thereof can be used. Here, graphite having high crystallinity has a high electroconductivity and an excellent adhesiveness with a positive electrode collector consisting of metal such as copper or the like as well as an excellent voltage flatness. On the other hand, since amorphous carbon having low crystallinity has a relatively low volume expansion, there is significant effect of relaxing the volume expansion of the entire anode, and deterioration due to ununiformity such as a crystal grain boundary or a defect hardly occurs.

As for metal oxide (b), all or a part thereof preferably has an amorphous structure. Metal oxide (b) having an amorphous structure can suppress the volume expansion of carbon material (c) or metal (a) and can also suppress decomposition of an electrolyte liquid containing a phosphate compound. This mechanism is not obvious, but the amorphous structure of metal oxide (b) is assumed to have some influences on a coating formation at the interface between carbon material (c) and the electrolyte liquid. Also, it is assumed that the amorphous structure has a relatively small constituent due to ununiformity such as a crystal grain boundary or a defect. Note that, it can be confirmed by X-ray diffraction measurement (general XRD measurement) that all or a part of metal oxide (b) has an amorphous structure. Specifically, in the case where metal oxide (b) does not have an amorphous structure, a peak peculiar to metal oxide (b) is observed, while in the case where all or a part of metal oxide (b) has an amorphous structure, a observed peak peculiar to metal oxide (b) becomes to be broad.

Metal oxide (b) is preferably an oxide of metal which constitutes metal (a). Also, metal (a) and metal oxide (b) are preferably silicon (Si) and silicon oxide (SiO), respectively.

As for metal (a), all or a part thereof is dispersed in metal oxide (b). The dispersion of at least a part of metal (a) in metal oxide (b) can suppress the volume expansion of the negative electrode as a whole and can also suppress decomposition of an electrolyte liquid. Note that, it can be confirmed by transmission electron microscope observation (general TEM observation) and along with energy dispersive X-ray spectroscopy measurement (general EDX measurement) that all or a part of metal (a) is dispersed in metal oxide (b). Specifically, a section of a specimen of metal particle (a) is observed and oxygen atom concentration of metal particle (a) which is dispersing in metal oxide (b) is measured, and thereby it can be confirmed that a metal which constitutes metal particle (a) does not become an oxide.

As mentioned above, the content of metal (a), the content of metal oxide (b) and the content of carbon material (c) with respect to the total of metal (a), metal oxide (b) and carbon material (c) are preferably 5 mass % more and 90 mass % or less, 5 mass % more and 90 mass % or less, and 2 mass % more and 80 mass % or less, respectively. Also, the content of metal (a), the content of metal oxide (b) and the content of carbon material (c) with respect to the total of metal (a), metal oxide (b) and carbon material (c) are more preferably 20 mass % more and 50 mass % or less, 40 mass % more and 70 mass % or less, and 2 mass % more and 30 mass % or less, respectively.

A negative electrode active substance, in which all or a part of metal oxide (b) has an amorphous structure and in which all or a part of metal (a) is dispersed in metal oxide (b), can be produced, for example, by the method disclosed in Patent document 3. That is, CVD processing of metal oxide (b) is carried out under an atmosphere containing organic substance gas such as methane gas, to obtain a complex in which metal (a) in metal oxide (b) is a nanocluster and in which the surface is covered with carbon material (c). Also, the above-mentioned anode active substance is also produced by mixing carbon material (c), metal (a) and metal oxide (b) by mechanical milling.

Also, each of metal (a), metal oxide (b) and carbon material (c) that is used can be, but should not particularly be limited to, a particle thereof. For example, the average particle diameter of metal (a) can be constituted in a range smaller than the average particle diameter of carbon material (c) and the average particle diameter of metal oxide (b). By this constitution, since metal (a) in which the volume change associated with charge and discharge is small has a relatively small particle diameter, and since carbon material (c) and metal oxide (b) in which the volume change is large has a relatively large particle diameter, dendrite generation and the pulverization of alloy are more effectively suppressed. Also, in the process of charge and discharge, lithium is absorbed and desorbed from the larger diameter particle, the smaller diameter particle and the larger diameter particle in this order. From this point, the residual stress and the residual strain are suppressed. The average particle diameter of metal (a) can be, for example, 20 μm or less, and is preferably 15 μm or less.

Also, it is preferable that the average particle diameter of metal oxide (b) be a half or less of the average particle diameter of carbon material (c), and it is preferable that the average particle diameter of metal (a) be a half or less of the average particle diameter of metal oxide (b). Further, it is more preferable that the average particle diameter of metal oxide (b) be a half or less of the average particle diameter of carbon material (c) as well as that the average particle diameter of metal (a) be a half or less of the average particle diameter of metal oxide (b). Controlling of the average particle diameter in this range can more advantageously give the effect of relaxing effect of the volume expansion of the metal and alloy phase, and can provide a secondary battery having an excellent balance of an energy density, a cycle life and an efficiency. More specifically, it is preferable that the average particle diameter of silicon oxide (b) be a half or less of the average particle diameter of graphite (c) and that the average particle diameter of silicon (a) be a half or less of the average particle diameter of silicon oxide (b). Also, more specifically, the average particle diameter of silicon (a) can be, for example, 20 μm or less, and is preferably 15 μm or less.

As a negative electrode binder, at least one selected from polyimides (PI) and polyamide-imides (PAI) can be used. By using a polyimide or a polyamide-imide as the negative electrode binder, the adhesiveness of the negative electrode active substance to the collector is improved and the electrical contact of the collector to the negative electrode active substance keeps good even if charging and discharging are repeated, which results in obtaining a good cycle property.

The content of the negative electrode binder is preferably in the range of 1 to 30 mass % with respect to the total of the negative electrode active substance and the negative electrode binder, and is more preferably in the range of 2 to 25 mass %. When it is 1 mass % or more, the adhesiveness of the active substances or of the active substance to the collector is improved and the cycle property becomes good. Also, when it is 30 mass % or less, the ratio of the active substance proportion is improved and the negative electrode capacity can be improved.

A negative electrode collector is not particularly limited, but aluminum, nickel, copper, silver and alloying thereof are preferable from the electrochemical stability. Examples of the shape thereof include foil, flat plate and mesh.

A negative electrode can be produced by forming a negative electrode active substance layer containing a negative electrode active substance and a negative electrode binder on a negative electrode collector. Examples of the method for forming the negative electrode active substance layer include doctor blade method, die coater method, CVD method, and sputtering method. A negative electrode active substance layer is first formed, and a thin film of aluminum, nickel or an alloy thereof is thereafter formed by vapor deposition, sputtering or the like to obtain the anode collector.

[2] Positive Electrode

A positive electrode is formed, for example, by binding a positive electrode active substance on a positive electrode collector with a positive electrode binder so that the positive electrode active substance covers the positive electrode collector.

Examples of the positive electrode active substance include lithium manganates having a lamellar structure or lithium manganates having a Spinel structure including $LiMnO_2$ and $Li_xMn_2O_4$ (0<x<2); $LiCoO_2$, $LiNiO_2$ and materials in which a part of transition metal thereof are substituted with another metal; lithium transition metal oxides such as $LiNi_{1/3}Co_{1/3}Mn_{1/3}O_2$ in which the molar ratio of a particular transition metal is not more than one half; and materials which have lithium at a larger amount than the stoichiometric amount in these lithium transition metal oxides. In particular, $Li_\alpha Ni_\beta Co_\gamma Al_\delta O_2$ (1≤α≤1.2, β+γ+δ=1, β≥0.7, and γ≤0.2) or $Li_\alpha Ni_\beta Co_\gamma Mn_\delta O_2$ (1≤α≤1.2, β+γ+δ=1, β≥0.6, and γ≤0.2) is preferable. The positive electrode active substance can be used alone, or in combination with two or more kinds.

As a positive electrode binder, the same materials for a negative electrode binder can be used. Among these, from the standpoint of versatility and low cost, polyvinylidene fluorides are preferable. The content of the positive electrode binder is preferably 1 to 20 mass % with respect to the total amount of the positive electrode active substance and the positive electrode binder, and is more preferably 2 to 10 mass %, from the standpoint of "sufficient binding force" and "high energy" which are trade-off to each other.

As a positive electrode collector, the same materials for a negative electrode collector can be used.

For the purpose of reducing the impedance, an electroconductive auxiliary material may be added to a positive electrode active substance layer containing a positive electrode active substance. Examples of the electroconductive auxiliary material include carbonaceous fine particles such as graphite, carbon black, and acetylene black.

[3] Electrolyte Liquid

An electrolyte liquid used in the exemplary embodiment of the invention is explained below.

A first electrolyte liquid contains a compound represented by following formula (1).

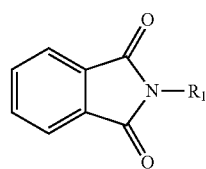

(1)

($R_1$ represents hydrogen atom, an alkyl group, an aryl group, an amino group, hydroxy group or a halogen atom, wherein the alkyl group or the aryl group may be substituted.)

In $R_1$, the alkyl group may be a straight-chain alkyl group, a branched alkyl group or a cyclic alkyl group, but is preferably a straight-chain alkyl group.

In $R_1$, the alkyl group or the aryl group may be substituted, and examples of the substituent include aryl groups such as phenyl group, carboxy group, hydroxy group or halogen atoms such as F, Br or Cl.

The total carbon number of $R_1$ is preferably 1 to 12, more preferably 1 to 8, and further preferably 1 to 6.

Also, in formula (1), hydrogen atom of the aromatic ring may be substituted by an amino group, and examples thereof include, for example, 4-aminophthalimide.

By using an electrolyte liquid containing a compound represented by formula (1), the swelling can be suppressed and the cycle property can be improved. This is inferred to be because an imide group is absorbed on the surface of silicon to form an SEI.

A second electrolyte liquid contains a compound represented by following formula (2).

(2)

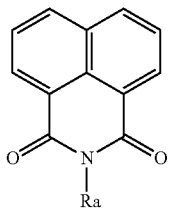

(Ra represents hydrogen atom, an alkyl group, an aryl group, an amino group, hydroxy group or a halogen atom, wherein the alkyl group or the aryl group may be substituted.)

In Ra, the alkyl group may be a straight-chain alkyl group, a branched alkyl group or a cyclic alkyl group, but is preferably a straight-chain alkyl group.

In Ra, the alkyl group or the aryl group may be substituted, and examples of the substituent include aryl groups such as phenyl group, carboxy group, hydroxy group or halogen atoms such as F, Br or Cl.

The total carbon number of Ra is preferably 1 to 12, more preferably 1 to 8, and further preferably 1 to 6.

By using an electrolyte liquid containing a compound represented by formula (2), the swelling can be suppressed and the cycle property can be improved. This is inferred to be because an imide group is absorbed on the surface of silicon to form an SEI.

A third electrolyte liquid contains a compound represented by following formula (3).

(3)

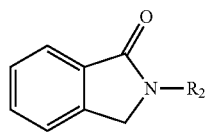

($R_2$ represents hydrogen atom, an alkyl group, an aryl group, an amino group, hydroxy group or a halogen atom, wherein the alkyl group or the aryl group may be substituted.)

In $R_2$, the alkyl group may be a straight-chain alkyl group, a branched alkyl group or a cyclic alkyl group, but is preferably a straight-chain alkyl group.

In $R_2$, the alkyl group or the aryl group may be substituted, and examples of the substituent include aryl groups such as phenyl group, carboxy group, hydroxy group or halogen atoms such as F, Br or Cl.

The total carbon number of $R_2$ is preferably 1 to 12, more preferably 1 to 8, and further preferably 1 to 6.

By using an electrolyte liquid containing a compound represented by formula (3), the swelling can be suppressed and the cycle property can be improved. This is inferred to be because an imide group is absorbed on the surface of silicon to form an SEI.

A fourth electrolyte liquid contains a compound represented by following formula (4).

(4)

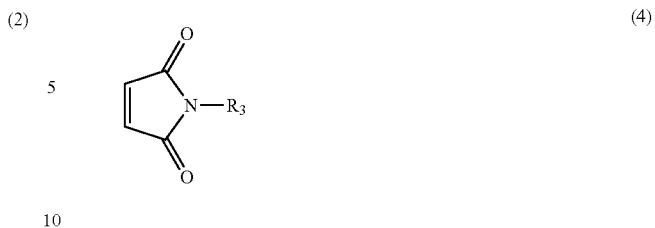

($R_3$ represents hydrogen atom, an alkyl group, an aryl group, an amino group, hydroxy group or a halogen atom, wherein the alkyl group or the aryl group may be substituted.)

In $R_3$, the alkyl group may be a straight-chain alkyl group, a branched alkyl group or a cyclic alkyl group, but is preferably a straight-chain alkyl group.

In $R_3$, the alkyl group or the aryl group may be substituted, and examples of the substituent include aryl groups such as phenyl group, carboxy group, hydroxy group or halogen atoms such as F, Br or Cl.

The total carbon number of $R_3$ is preferably 1 to 12, more preferably 1 to 8, and further preferably 1 to 6.

By using an electrolyte liquid containing a compound represented by formula (4), the swelling can be suppressed and the cycle property can be improved. This is inferred to be because an imide group is absorbed on the surface of silicon and the double bond is further electropolymerized on the surface of silicon to form an SEI.

A fifth electrolyte liquid contains a compound represented by following formula (5).

(5)

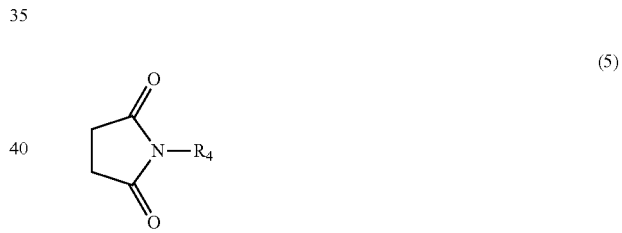

($R_4$ represents hydrogen atom, an alkyl group, an aryl group, an amino group, hydroxy group or a halogen atom, wherein the alkyl group or the aryl group may be substituted.)

In $R_4$, the alkyl group may be a straight-chain alkyl group, a branched alkyl group or a cyclic alkyl group, but is preferably a straight-chain alkyl group or a cyclic alkyl group and is further preferably a cyclic alkyl group.

In $R_4$, the alkyl group or the aryl group may be substituted, and examples of the substituent include aryl groups such as phenyl group, carboxy group, hydroxy group or halogen atoms such as F, Br or Cl.

The total carbon number of $R_4$ is preferably 1 to 12, more preferably 1 to 8, and further preferably 1 to 6.

By using an electrolyte liquid containing a compound represented by formula (5), the swelling can be suppressed and the cycle property can be improved. This is inferred to be because an imide group is absorbed on the surface of silicon to form an SEI.

A sixth electrolyte liquid contains a compound represented by following formula (6).

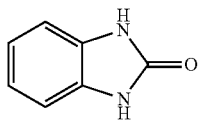

(6)

By using an electrolyte liquid containing a compound represented by formula (6), the swelling can be suppressed and the cycle property can be improved. This is inferred to be because an imide group is absorbed on the surface of silicon to form an SEI.

A seventh electrolyte liquid contains a compound represented by following formula (7).

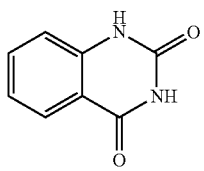

(7)

By using an electrolyte liquid containing a compound represented by formula (7), the swelling can be suppressed and the cycle property can be improved. This is inferred to be because an imide group is absorbed on the surface of silicon to form an SEI.

An eighth electrolyte liquid contains a compound represented by following formula (8).

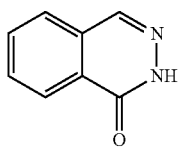

(8)

By using an electrolyte liquid containing a compound represented by formula (8), the swelling can be suppressed and the cycle property can be improved. This is inferred to be because an imide group is absorbed on the surface of silicon to form an SEI.

A ninth electrolyte liquid contains a compound represented by following formula (9).

$$R_5-N=C=N-R_6 \quad (9)$$

($R_5$ and $R_6$ each independently represent hydrogen atom, an alkyl group, an aryl group, an amino group, hydroxy group or a halogen atom, wherein the alkyl group or the aryl group may be substituted.)

Also, $R_5$ and $R_6$ are each independently preferably an alkyl group or an aryl group, and $R_5$ and $R_6$ are preferably the same group.

In $R_5$ and $R_6$, the alkyl group may be a straight-chain alkyl group, a branched alkyl group or a cyclic alkyl group, but is preferably a branched alkyl group or a cyclic alkyl group.

In each of $R_5$ and $R_6$, the alkyl group or the aryl group may respectively be substituted, and examples of the substituent include alkyl groups, aryl groups such as phenyl group, carboxy group, hydroxy group or halogen atoms such as F, Br or Cl.

Each total carbon number of $R_5$ and $R_6$ is preferably 1 to 12, more preferably 1 to 8, and further preferably 1 to 6.

By using an electrolyte liquid containing a compound represented by formula (9), the generation of the swelling can be suppressed and the cycle property can be improved. This is inferred to be because a carbodiimide group is absorbed on the surface of silicon to form an SEI, and further because generation of HF is suppressed by the dehydrating effect of the carbodiimide and decomposition of the electrolyte liquid is suppressed.

The content of the compound represented by formulae (1) to (9) is not particularly limited, but is preferably 0.1 to 30 mass % with respect to the total amount of the compound represented by formulae (1) to (9) and the nonaqueous electrolyte solvent, is more preferably 0.5 to 20 mass %, and is further preferably 1 to 5 mass %. When it is 30 mass % or less, the dielectric constant of the electrolyte liquid is suppressed to be lowered too much and the capacity is easy to be improved. Also, when it is 0.1 mass % or more, the cycle property is easy to be further improved.

An electrolyte liquid generally contains a nonaqueous electrolyte solvent. Examples of the nonaqueous electrolyte solvent include, but should not particularly be limited to, for example, non-protic organic solvents such as: cyclic-type carbonates such as propylene carbonate (PC), ethylene carbonate (EC), butylene carbonate (BC), and vinylene carbonate (VC); linear-type carbonates such as dimethyl carbonate (DMC), diethyl carbonate (DEC), ethyl methyl carbonate (EMC), and dipropyl carbonate (DPC); propylene carbonate derivatives; and aliphatic carboxylates such as methyl formate, methyl acetate, and ethyl propionate. As the nonaqueous electrolyte solvent, cyclic-type or linear-type carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and dipropyl carbonate (DPC) are preferable. The nonaqueous electrolyte solvent can be used alone, or in combination with two or more kinds.

Also, in an exemplary embodiment of the invention, it is preferable to use a cyclic-type or linear-type carbonate as the nonaqueous electrolyte solvent. By using a carbonate, the specific dielectric constant becomes large and the ionic dissociation can be improved. Also, since the viscosity of the electrolyte liquid is lowered, the ionic mobility can be improved. The content of each compound represented by formulae (1) to (9) in the electrolyte liquid is preferably 1 to 30 mass % with respect to the total amount of the compound and the carbonate, is more preferably 1 to 20 mass %, and is further preferably 1 to 5 mass %.

An electrolyte liquid further contains a supporting salt. Examples of the supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, and $LiN(CF_3SO_2)_2$. The supporting salt can be used alone, or in combination with two or more kinds.

[4] Separator

As a separator, a porous film or a nonwoven cloth of polypropylene, polyethylene or the like can be used. A separator in which these are stacked can also be used.

[5] Package

A package is arbitrarily selected as long as it is stable against an electrolyte liquid and it has a sufficient water vapor barrier property. For example, in the case of a stacked laminate type secondary battery, a lamination film of polypropylene, polyethylene or the like which is coated with aluminum or silica is preferably used as a package. In particular, it is preferable to use an aluminum lamination film from the standpoint of suppressing the volume expansion.

In the case of a secondary battery in which a lamination film is used as a package, when a gas is generated, a distortion of the electrode assembly becomes much larger than in the case of a secondary battery in which a metal can is used as a package. This is because the lamination film is easily deformed by the inner pressure of the secondary battery in comparison with the metal can. Further, in the case of the secondary battery in which a lamination film is used as a package, when it is sealed, the inner pressure of the battery is generally set to be lower than atmospheric pressure. Thus, the battery does not have extra space inside, which can easily and directly cause a volume change of the battery and deformation of the electrode assembly when gas is generated. However, a secondary battery according to an exemplary embodiment of the invention can prevent the above-mentioned problem because the generation of the swelling can be suppressed. As a result, a stacked laminate type lithium ion secondary battery which is cheap and which is superior in that there is more latitude to increase cell capacity by changing the number of lamination can be provided.

EXAMPLE

As follows, an exemplary embodiment of the invention is more specifically explained by the Examples.

Example 1

A silicon having an average particle diameter of 5 μm as metal (a), an amorphous silicon oxide ($SiO_x$, $0<x\le2$) having an average particle diameter of 13 μm as metal oxide (b), and a graphite having an average particle diameter of 30 μm as carbon material (c) were weighed at a mass ratio of 29:61:10. Then, these materials were mixed by so-called mechanical milling for 24 hours to obtain a negative electrode active substance. Note that, in this anode active substance, the silicon that is metal (a) was dispersed in the silicon oxide ($SiO_x$, $0<x\le2$) that is metal oxide (b).

The above-mentioned anode active substance (average particle diameter $D_{50}$=5 μm) and a polyimide (produced by UBE INDUSTRIES, trade name: U varnish A) as a negative electrode binder were weighed at a mass ratio of 85:15 and they were mixed with n-methylpyrrolidone to prepare a negative electrode slurry. The negative electrode slurry was applied to a copper foil having a thickness of 10 μm and was then dried, and it was further heat-treated under nitrogen atmosphere at 300° C. to produce a negative electrode. Note that, in TABLE 1, the content (%) of the negative electrode binder represents the content (mass %) of the negative electrode binder in the negative electrode active substance and the negative electrode binder.

Lithium nickelate ($LiNi_{0.80}Co_{0.15}Al_{0.15}O_2$) as a positive electrode active substance, carbon black as an electroconductive auxiliary material, and a polyvinylidene fluoride as a positive electrode binder were weighed at a mass ratio of 90:5:5. Then, they were mixed with n-methylpyrrolidone to prepare a positive electrode slurry. The positive electrode slurry was applied to an aluminum foil having a thickness of 20 μm and was then dried, and it was further pressed to produce a negative electrode.

Three layers of the positive electrode that was obtained and four layers of the negative electrode that was obtained were alternately stacked with a polypropylene porous film as a separator placed therebetween. End parts of the positive electrode collectors which were not covered with the positive electrode active substance and end parts of the negative electrodes collectors which were not covered with the negative electrode active substance were respectively welded. Further, an aluminum cathode terminal and a nickel anode terminal were respectively welded thereto, to obtain an electrode assembly which had a planar stacking conformation.

On the other hand, N-methylphtalimide (formula (1)) as a compound represented by each formula and a carbonate nonaqueous electrolyte solvent were mixed in a ratio of 2 parts by mass and 98 parts by mass, respectively, to prepare a mixed solution. Further, $LiPF_6$ as a supporting salt was dissolved in this mixed solution at a concentration of 1 mol/l to prepare an electrolyte liquid. Note that, a mixed solvent of EC/PC/DMC/EMC/DEC=20/20/20/20/20 (volume ratio) was used as the carbonate nonaqueous electrolyte solvent. Note that, in TABLE 1, (d) represents a compound represented by each formula, and the content (%) of (d) in the solvent represents a content (mass %) of each compound with respect to the compound represent by each formula and the carbonate nonaqueous electrolyte solvent.

The above-mentioned electrode assembly was enclosed in an aluminum lamination film as a package and the electrolyte liquid was poured thereinto, and it was then depressurized to 0.1 atm and was sealed to produce a secondary battery.

<Evaluation>

(Cycle at 20° C.)

Tests for the secondary batteries produced were carried out in which they were repeatedly charged and discharged within a voltage range of 2.5 V to 4.1 V in a thermostatic oven which was kept at a temperature of 20° C., to evaluate the retention ratio (%) and the swelling (%). The results are shown in TABLE 1. In TABLE 1, "retention ratio (%)" represents (discharged capacity at the $150^{th}$ cycle)/(discharged capacity at the $1^{st}$ cycle)×100 (unit: %). Also, "swelling (volume increase) (%)" represents {volume capacity at the $150^{th}$ cycle)/(volume capacity at the $1^{st}$ cycle)−1}×100 (%) (unit: %).

(Cycle at 60° C.)

Tests for the secondary batteries produced were carried out in which the batteries were repeatedly charged and discharged within a voltage range of 2.5 V to 4.1 V in a thermostatic oven which was kept at a temperature of 60° C., to evaluate the retention ratio (%) and the swelling (%). The results are shown in TABLE 1. In TABLE 1, "retention ratio (%)" represents (discharged capacity at the $50^{th}$ cycle)/(discharged capacity at the $1^{st}$ cycle)×100 (unit: %). Also, "swelling (volume increase) (%)" represents {volume capacity at the $50^{th}$ cycle)/(volume capacity at the $1^{st}$ cycle)−1}×100 (%) (unit: %).

Examples 2 to 52

Secondary batteries were produced in the same manner as in Example 1 except that the kind of the negative electrode binder and the kind of the compound represented by each formula were selected as shown in TABLES 1 to 3, and the evaluations were carried out. The results are shown in TABLES 1 to 3.

Example 53

A negative electrode active substance which contained silicon, an amorphous silicon oxide ($SiO_x$, $0<x\le2$) and a carbon at a mass ratio of 29:61:10 was obtained by the same method described in Patent document 3. Note that, in this anode active substance, the silicon that is metal (a) was dispersed in the amorphous silicon oxide that is metal oxide (b). Then, the example was carried out in the same manner as in Example 1 except that this anode active substance was used. The results are shown in TABLE 3.

Example 54

This example was carried out in the same manner as in Example 8 except that the negative electrode active substance used in Example 53 was used. The results are shown in TABLE 3.

Example 55

This example was carried out in the same manner as in Example 11 except that the negative electrode active substance used in Example 53 was used. The results are shown in TABLE 3.

Example 56

This example was carried out in the same manner as in Example 15 except that the negative electrode active substance used in Example 53 was used. The results are shown in TABLE 3.

Example 57

This example was carried out in the same manner as in Example 20 except that the negative electrode active substance used in Example 53 was used. The results are shown in TABLE 3.

Example 58

This example was carried out in the same manner as in Example 24 except that the negative electrode active substance used in Example 53 was used. The results are shown in TABLE 3.

Comparative Examples 1 to 3

Secondary batteries were produced in the same manner as in Example 1 except that the kind of the negative electrode binder was selected as shown in TABLE 4 and that the compound represented by each formula was not used, and the evaluations were carried out. The results are shown in TABLE 4.

Comparative Examples 4 to 7

Secondary batteries were produced in the same manner as in Example 1 except that the kind of the negative electrode binder and the kind of the compound represented by each formula were selected as shown in TABLE 4, and the evaluations were carried out. The results are shown in TABLE 4.

TABLE 1

| | | anode binder | | | | cycle at 20° C. | | | | cycle at 60° C. | | | |
| | | | | | | retention ratio | | swelling <volume> | | retention ratio | | swelling <volume> | |
| | ratio of Si/SiO/C | kind | content (%) | imide compound (d) | content (%) of (d) | (%) | judgment | (%) | judgment | (%) | judgment | (%) | judgment |
|---|---|---|---|---|---|---|---|---|---|---|---|---|---|
| Example1 | 29/61/10 | PI | 15 | N-methyl-phthalimide | 2 | 85 | ○ | 1 | ○ | 80 | ○ | 3 | ○ |
| Example2 | 29/61/10 | PI | 15 | N-hydroxy-phthalimide | 2 | 78 | ○ | 2 | ○ | 75 | ○ | 6 | ○ |
| Example3 | 29/61/10 | PI | 15 | N-(hydroxy-methyl)phthalimide | 2 | 79 | ○ | 2 | ○ | 77 | ○ | 9 | ○ |
| Example4 | 29/61/10 | PI | 15 | 4-amino-phthalimide | 2 | 71 | ○ | 6 | ○ | 69 | ○ | 14 | ○ |
| Example5 | 29/61/10 | PI | 15 | N-(4-bromo-butyl)phthalimide | 2 | 74 | ○ | 6 | ○ | 65 | ○ | 12 | ○ |
| Example6 | 29/61/10 | PI | 15 | N-(2-bromo-ethyl)phthalimide | 2 | 75 | ○ | 3 | ○ | 61 | ○ | 8 | ○ |
| Example7 | 29/61/10 | PI | 15 | N-(chloro-methyl)phthalimide | 2 | 80 | ○ | 4 | ○ | 78 | ○ | 7 | ○ |
| Example8 | 29/61/10 | PI | 15 | 1,8-naphthalimide | 2 | 78 | ○ | 3 | ○ | 68 | ○ | 6 | ○ |
| Example9 | 29/61/10 | PI | 15 | 4-amino-1,8-naphthalimide | 2 | 69 | ○ | 5 | ○ | 61 | ○ | 10 | ○ |
| Example10 | 29/61/10 | PI | 15 | N-hydroxy-1,8-naphthalimide | 2 | 80 | ○ | 2 | ○ | 61 | ○ | 5 | ○ |
| Example11 | 29/61/10 | PI | 15 | N-ethylmaleimide | 2 | 81 | ○ | 2 | ○ | 79 | ○ | 6 | ○ |
| Example12 | 29/61/10 | PI | 15 | N-phenylmaleimide | 2 | 78 | ○ | 3 | ○ | 68 | ○ | 8 | ○ |
| Example13 | 29/61/10 | PI | 15 | N-benzylmaleimide | 2 | 75 | ○ | 3 | ○ | 60 | ○ | 8 | ○ |
| Example14 | 29/61/10 | PI | 15 | 3-maleimide benzoic acid | 2 | 74 | ○ | 4 | ○ | 68 | ○ | 9 | ○ |
| Example15 | 29/61/10 | PI | 15 | succinimide | 2 | 80 | ○ | 2 | ○ | 78 | ○ | 7 | ○ |
| Example16 | 29/61/10 | PI | 15 | N-hydroxy-succinimide | 2 | 72 | ○ | 2 | ○ | 71 | ○ | 5 | ○ |
| Example17 | 29/61/10 | PI | 15 | N-bromo-succinimide | 2 | 78 | ○ | 5 | ○ | 76 | ○ | 12 | ○ |
| Example18 | 29/61/10 | PI | 15 | N-chloro-succinimide | 2 | 74 | ○ | 2 | ○ | 72 | ○ | 13 | ○ |
| Example19 | 29/61/10 | PI | 15 | N-(cyclo-hexyl)succinimide | 2 | 76 | ○ | 2 | ○ | 74 | ○ | 7 | ○ |
| Example20 | 29/61/10 | PI | 15 | phthalimidine | 2 | 71 | ○ | 3 | ○ | 69 | ○ | 11 | ○ |

TABLE 2

| | anode binder | | | | | cycle at 20° C. | | | | cycle at 60° C. | | | |
| | ratio of Si/SiO/C | kind | content (%) | imide compound (d) | content (%) of (d) | retention ratio (%) | judgment | swelling <volume> (%) | judgment | retention ratio (%) | judgment | swelling <volume> (%) | judgment |
|---|---|---|---|---|---|---|---|---|---|---|---|---|---|
| Example21 | 29/61/10 | PI | 15 | benzimidazolone | 2 | 68 | ○ | 7 | ○ | 66 | ○ | 16 | ○ |
| Example22 | 29/61/10 | PI | 15 | benzoyleneurea | 2 | 67 | ○ | 6 | ○ | 65 | ○ | 15 | ○ |
| Example23 | 29/61/10 | PI | 15 | pthalazone | 2 | 70 | ○ | 7 | ○ | 68 | ○ | 9 | ○ |
| Example24 | 29/61/10 | PI | 15 | N,N'-dicyclo-hexylcarbodiimide | 2 | 75 | ○ | 6 | ○ | 67 | ○ | 8 | ○ |
| Example25 | 29/61/10 | PI | 15 | N,N'-diisopropyl-carbodiimide | 2 | 78 | ○ | 4 | ○ | 75 | ○ | 12 | ○ |
| Example26 | 29/61/10 | PI | 15 | bis-2,6-diisopropyl-phenylcarbodiimide | 2 | 80 | ○ | 2 | ○ | 78 | ○ | 5 | ○ |
| Example27 | 29/61/10 | PAI | 15 | 4-aminophthalimide | 2 | 86 | ○ | 4 | ○ | 81 | ○ | 6 | ○ |
| Example28 | 29/61/10 | PAI | 15 | N-(4-bromo-butyl)phthalimide | 2 | 80 | ○ | 3 | ○ | 74 | ○ | 10 | ○ |
| Example29 | 29/61/10 | PAI | 15 | N-methylphthalimide | 2 | 81 | ○ | 3 | ○ | 79 | ○ | 8 | ○ |
| Example30 | 29/61/10 | PAI | 15 | N-(2-bromo-ethyl)phthalimide | 2 | 74 | ○ | 3 | ○ | 67 | ○ | 8 | ○ |
| Example31 | 29/61/10 | PAI | 15 | N-(chloro-methyl)phthalimide | 2 | 71 | ○ | 4 | ○ | 69 | ○ | 6 | ○ |
| Example32 | 29/61/10 | PAI | 15 | N-hydroxyphthalimide | 2 | 76 | ○ | 2 | ○ | 74 | ○ | 10 | ○ |
| Example33 | 29/61/10 | PAI | 15 | N-(hydroxy-methyl)phthalimide | 2 | 75 | ○ | 5 | ○ | 73 | ○ | 10 | ○ |
| Example34 | 29/61/10 | PAI | 15 | 1,8-naphthalimide | 2 | 78 | ○ | 3 | ○ | 76 | ○ | 8 | ○ |
| Example35 | 29/61/10 | PAI | 15 | 4-amino-1,8-naphthalimide | 2 | 80 | ○ | 2 | ○ | 78 | ○ | 6 | ○ |
| Example36 | 29/61/10 | PAI | 15 | N-hydroxy-1,8-naphthalimide | 2 | 78 | ○ | 3 | ○ | 74 | ○ | 8 | ○ |
| Example37 | 29/61/10 | PAI | 15 | N-ethylmaleimide | 2 | 74 | ○ | 4 | ○ | 71 | ○ | 9 | ○ |
| Example38 | 29/61/10 | PAI | 15 | N-phenylmaleimide | 2 | 76 | ○ | 5 | ○ | 72 | ○ | 12 | ○ |
| Example39 | 29/61/10 | PAI | 15 | N-benzylmaleimide | 2 | 71 | ○ | 4 | ○ | 72 | ○ | 9 | ○ |
| Example40 | 29/61/10 | PAI | 15 | 3-maleimide benzoic acid | 2 | 68 | ○ | 7 | ○ | 64 | ○ | 12 | ○ |

TABLE 3

| | anode binder | | | | | cycle at 20° C. | | | | cycle at 60° C. | | | |
| | ratio of Si/SiO/C | kind | content (%) | imide compound (d) | content (%) of (d) | retention ratio (%) | judgment | swelling <volume> (%) | judgment | retention ratio (%) | judgment | swelling <volume> (%) | judgment |
|---|---|---|---|---|---|---|---|---|---|---|---|---|---|
| Example41 | 29/61/10 | PAI | 15 | N-bromo-succinimide | 2 | 76 | ○ | 5 | ○ | 74 | ○ | 10 | ○ |
| Example42 | 29/61/10 | PAI | 15 | N-chloro-succinimide | 2 | 72 | ○ | 2 | ○ | 70 | ○ | 9 | ○ |
| Example43 | 29/61/10 | PAI | 15 | N-hydroxy-succinimide | 2 | 78 | ○ | 3 | ○ | 76 | ○ | 8 | ○ |
| Example44 | 29/61/10 | PAI | 15 | N-(cyclo-hexyl)succinimide | 2 | 74 | ○ | 5 | ○ | 72 | ○ | 10 | ○ |
| Example45 | 29/61/10 | PAI | 15 | succinimide | 2 | 76 | ○ | 2 | ○ | 74 | ○ | 7 | ○ |
| Example46 | 29/61/10 | PAI | 15 | phthalimidine | 2 | 71 | ○ | 2 | ○ | 69 | ○ | 12 | ○ |
| Example47 | 29/61/10 | PAI | 15 | benzimidazolone | 2 | 68 | ○ | 8 | ○ | 65 | ○ | 8 | ○ |
| Example48 | 29/61/10 | PAI | 15 | benzoyleneurea | 2 | 67 | ○ | 7 | ○ | 62 | ○ | 17 | ○ |
| Example49 | 29/61/10 | PAI | 15 | pthalazone | 2 | 70 | ○ | 6 | ○ | 68 | ○ | 15 | ○ |
| Example50 | 29/61/10 | PAI | 15 | N,N'-dicyclo-hexylcarbodiimide | 2 | 75 | ○ | 4 | ○ | 73 | ○ | 9 | ○ |
| Example51 | 29/61/10 | PAI | 15 | N,N'-diisopropyl-carbodiimide | 2 | 78 | ○ | 2 | ○ | 75 | ○ | 5 | ○ |
| Example52 | 29/61/10 | PAI | 15 | bis-2,6-diiso-propylphenyl-carbodiimide | 2 | 80 | ○ | 1 | ○ | 78 | ○ | 4 | ○ |
| Example53 | 29/61/10 | PI | 15 | N-methyl-phthalimide | 2 | 84 | ○ | 2 | ○ | 79 | ○ | 4 | ○ |
| Example54 | 29/61/10 | PI | 15 | 1,8-naphthalimide | 2 | 76 | ○ | 4 | ○ | 72 | ○ | 6 | ○ |
| Example55 | 29/61/10 | PI | 15 | N-ethylmaleimide | 2 | 80 | ○ | 2 | ○ | 78 | ○ | 4 | ○ |
| Example56 | 29/61/10 | PI | 15 | succinimide | 2 | 78 | ○ | 3 | ○ | 76 | ○ | 6 | ○ |
| Example57 | 29/61/10 | PI | 15 | phthalimidine | 2 | 72 | ○ | 7 | ○ | 67 | ○ | 10 | ○ |
| Example58 | 29/61/10 | PI | 15 | N,N'-dicyclo-hexylcarbodiimide | 2 | 78 | ○ | 4 | ○ | 69 | ○ | 9 | ○ |

TABLE 4

| | | anode binder | | imide compound (d) | content (%) of (d) | cycle at 20° C. | | | | cycle at 60° C. | | | |
| | | | | | | retention ratio | | swelling <volume> | | retention ratio | | swelling <volume> | |
| | ratio of Si/SiO/C | kind | content (%) | | | (%) | judgment | (%) | judgment | (%) | judgment | (%) | judgment |
|---|---|---|---|---|---|---|---|---|---|---|---|---|---|
| Comparative Example 1 | 29/61/10 | PVdF | 15 | none | 0 | 42 | x | 35 | x | 32 | x | 40 | x |
| Comparative Example 2 | 29/61/10 | PI | 15 | none | 0 | 48 | x | 25 | x | 42 | x | 35 | x |
| Comparative Example 3 | 29/61/10 | PAI | 15 | none | 0 | 47 | x | 28 | x | 41 | x | 24 | x |
| Comparative Example 4 | 29/61/10 | PVdF | 15 | N-methyl-phthalimide | 2 | 58 | x | 21 | x | 55 | x | 26 | x |
| Comparative Example 5 | 29/61/10 | PVdF | 15 | N-ethyl-maleimide | 2 | 49 | x | 24 | x | 47 | x | 23 | x |
| Comparative Example 6 | 29/61/10 | PVdF | 15 | succinimide | 2 | 54 | x | 26 | x | 52 | x | 26 | x |
| Comparative Example 7 | 29/61/10 | PVdF | 15 | N,N'-dicyclohexylcarbodiimide | 2 | 51 | x | 20 | x | 47 | x | 21 | x |

The present application claims the priority based on Japanese Patent Application No. 2010-196621, filed on Sep. 2, 2010, all the disclosure of which is incorporated herein by reference.

The present invention was explained with reference to embodiments and Examples, but the present invention is not limited to the above-mentioned embodiments and the Examples. In the constituents and the detail of the present invention, various changings which are understood by a person ordinarily skilled in the art can be made within the scope of the invention.

INDUSTRIAL APPLICABILITY

An exemplary embodiment of the invention can be utilized in every industrial field that requires a power supply and in an industrial field concerning a transportation, a storage and a supply of an electrical energy. Specifically, it can be utilized, for examples, for a power supply of a mobile device such as a mobile phone and a laptop computer; a power supply of a moving or a transport medium such as a train, a satellite and a submarine, and which includes an electric vehicle such as an electric car, a hybrid car, an electric motorcycle and an electric power-assisted bicycle; a back-up power supply such as UPS; and a power storage device of an electric power which is generated by solar power generation or wind power generation.

REFERENCE SIGNS LIST a anode
b separator
c cathode
d anode collector
e cathode collector
f cathode terminal
g anode terminal

What is claimed is:
1. A secondary battery, comprising an electrode assembly in which a positive electrode and a negative electrode are oppositely disposed, an electrolyte liquid, and a package which encloses the electrode assembly and the electrolyte liquid inside;
wherein the negative electrode is formed by binding a negative electrode active substance, which comprises a metal (a) that can be alloyed with lithium, a metal oxide (b) that can absorb and desorb lithium ion, and a carbon material (c) that can absorb and desorb lithium ion, to a negative electrode collector with at least one selected from polyimides and polyamide-imides; and
wherein the electrolyte liquid comprises a compound represented by any one of following formulae (1)-(3), (5), (8) and (9):

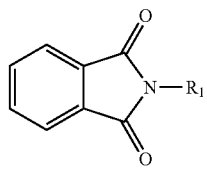

(1)

($R_1$ represents hydrogen atom, an alkyl group, an aryl group, an amino group, hydroxy group or a halogen atom, wherein the alkyl group or the aryl group may be substituted),

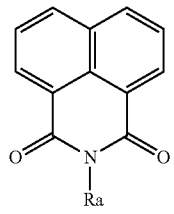

(2)

(Ra represents hydrogen atom, an alkyl group, an aryl group, an amino group, hydroxy group or a halogen atom, wherein the alkyl group or the aryl group may be substituted),

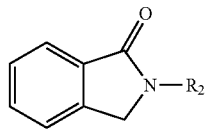

(3)

($R_2$ represents hydrogen atom, an alkyl group, an aryl group, an amino group, hydroxy group or a halogen atom, wherein the alkyl group or the aryl group may be substituted),

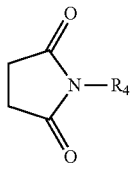 (5)

($R_4$ represents hydrogen atom, an alkyl group, an aryl group, an amino group, hydroxy group or a halogen atom, wherein the alkyl group or the aryl group may be substituted),

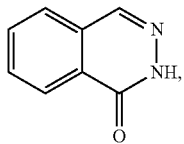 (8)

and

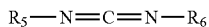 (9)

($R_5$ and $R_6$ each independently represent hydrogen atom, an alkyl group, an aryl group, an amino group, hydroxy group or a halogen atom, wherein the alkyl group or the aryl group may be substituted).

2. The secondary battery according to claim 1, wherein the electrolyte liquid further comprise a linear-type or cyclic-type carbonate.

3. The secondary battery according to claim 1, wherein all or a part of the metal oxide (b) has an amorphous structure.

4. The secondary battery according to claim 1, wherein the metal oxide (b) is an oxide of a metal which constitutes the metal (a).

5. The secondary battery according to claim 1, wherein the metal (a) is silicon.

6. The secondary battery according to claim 1, wherein all or a part of the metal (a) is dispersed in the metal oxide (b).

7. The secondary battery according to claim 1, wherein the electrode assembly has a planar stacking conformation, and wherein the package is a lamination film.

8. The secondary battery according to claim 1, wherein the package is an aluminum lamination film.

9. The secondary battery according to claim 1, wherein the metal (a) is silicon, and the metal oxide (b) is silicon oxide, and all or a part of the metal (a) is dispersed in the metal oxide (b).

10. The secondary battery according to claim 2, wherein the metal (a) is silicon, and the metal oxide (b) is silicon oxide, and all or a part of the metal (a) is dispersed in the metal oxide (b).

11. The secondary battery according to claim 1, wherein the negative electrode is formed by binding the negative electrode active substance to the negative electrode collector with polyamide-imides.

* * * * *